United States Patent [19]

Smith

[11] Patent Number: 5,424,500
[45] Date of Patent: Jun. 13, 1995

[54] DOOR-MOUNTED OPERATING MECHANISM FOR ELECTRICAL SWITCHGEAR

[75] Inventor: Lloyd B. Smith, Bristol, Tenn.

[73] Assignee: Electro-Mechanical Corporation, Bristol, Va.

[21] Appl. No.: 225,056

[22] Filed: Apr. 8, 1994

[51] Int. Cl.$^6$ .................... H01H 3/20; H01H 9/20; H02B 1/38
[52] U.S. Cl. .................. 200/50 A; 200/330; 200/337; 361/616
[58] Field of Search ............. 200/50 R, 50 A, 50 AA, 200/50 C, 329, 330, 337, 400; 361/615, 616

[56] References Cited

U.S. PATENT DOCUMENTS

| | | | |
|---|---|---|---|
| 2,760,021 | 8/1956 | Cole et al. | 200/50 A |
| 2,946,865 | 7/1960 | Thomas | 200/50 A |
| 3,179,762 | 4/1965 | Swinney | 200/50 |
| 3,229,056 | 1/1966 | Turnbull | 200/50 A |
| 3,385,938 | 5/1968 | Shockelt | 200/50 R |
| 3,801,765 | 4/1974 | Hodgson | 200/400 X |
| 4,107,486 | 8/1978 | Evans | 200/48 R |
| 4,168,417 | 9/1979 | Puetz et al. | 200/330 |
| 4,492,831 | 1/1985 | Oakes | 200/50 A |
| 4,612,424 | 9/1986 | Clark et al. | 200/50 A |

Primary Examiner—J. R. Scott
Attorney, Agent, or Firm—Veal & Marsh

[57] ABSTRACT

The present invention is for use with high-tension electrical switchgear enclosed within a cabinet. The output shaft of a spring operating mechanism mounted on the exterior of the main safety door extends through the door and is connected to a bell crank. As the shaft rotates the bell crank, it imparts force to a first substantially vertical push rod which in turn imparts force to a second bell crank. An arm of the second bell crank imparts force to a second push rod which is connected to a lever arm that is connected to the operating shaft of the electrical switch, thereby opening or closing the switch. The first push rod has ball joints at both ends and a free twisting joint along the rod, thereby allowing opening of the door without disconnecting the operating mechanism. A push rod connected to the first bell crank engages a lip affixed to the cabinet wall to prevent opening of the door when the switch is closed. A switch detent, rotatably mounted to the interior of the door on an interlock shaft, is spring-biased to engage the first bell crank when the door is open, preventing closing of the switch. When the door is closed, a push rod engages the wall of the cabinet and rotates a lever arm affixed to the interlock shaft, rotating the detent away from the first bell crank, allowing closing of the switch.

20 Claims, 8 Drawing Sheets

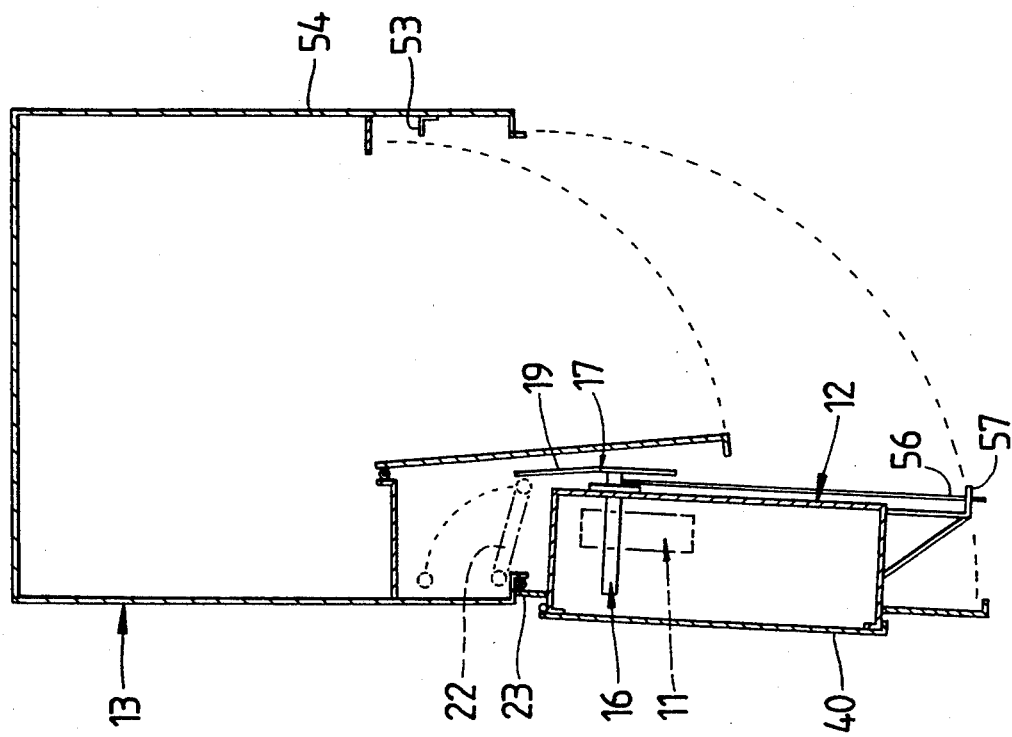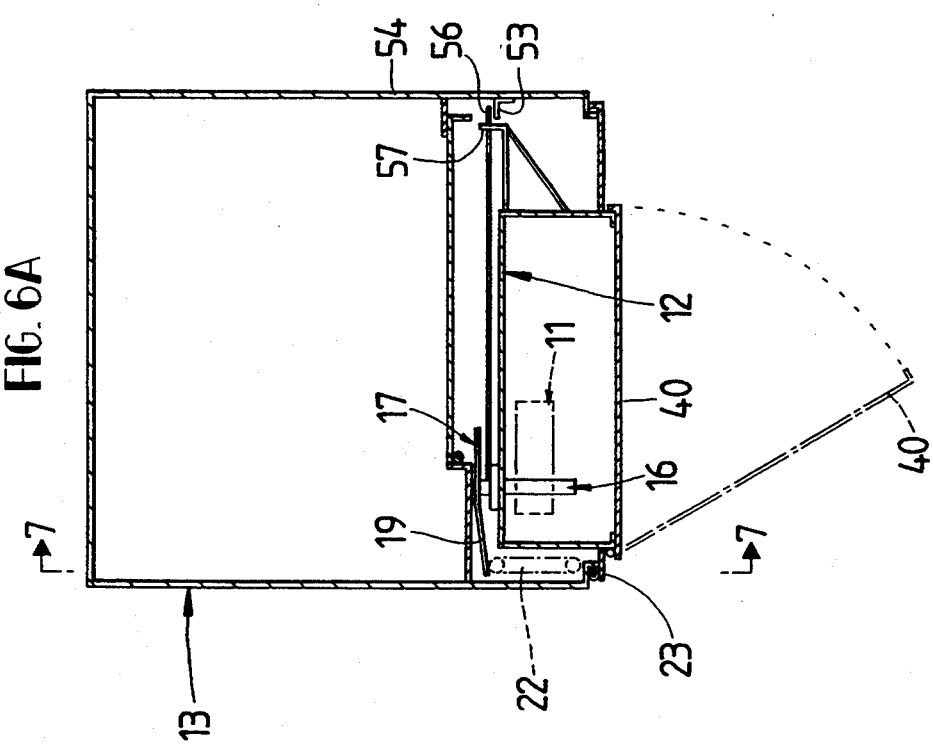

DOOR-MOUNTED OPERATING MECHANISM FOR ELECTRICAL SWITCHGEAR

FIELD OF THE INVENTION

The present invention relates to electrical switchgear. More particularly, the present invention relates to cabinet-enclosed high-voltage electrical switchgear. Still more particularly, the present invention relates to switchgear operating systems. Even more particularly, the present invention relates to an apparatus which allows the mounting of all of the operating systems except the switch and the safety interlocks on the exterior of a safety door, thereby allowing access to the operating systems for maintenance while maintaining a safety barrier between maintenance personnel and the energized switch. The apparatus further provides means for maintaining operative connection between the operating system and the switch when the safety door to the cabinet is opened.

BACKGROUND OF THE INVENTION

High-tension electrical switches are operated in the following manner: (1) a spring operating mechanism is charged either by manual force on a crank or by a motorized charger; (2) the energy stored in the springs is released by a tripping mechanism, typically either solenoid trip mechanisms or automatic release pawls that trip the operating mechanism at the end of the charging stroke; then (3) the released energy of the spring mechanism is transferred to the switch, causing the switch to open or close rapidly. The operation of a typical high-tension switch requires the precise transmission of bursts of torsional energy from the spring operating mechanism to the switch. In order to achieve this, most switches couple the spring operating mechanism directly to the switch. High-tension electrical switchgear components are therefore normally mounted within a metal cabinet which holds the operating mechanism, the switch, fuses, and other instrumentation.

Especially when the high-tension switchgear is motorized, it is important that maintenance personnel be able to repair and test the operating mechanism without actually opening or closing the switch. A commonly used system which allows maintenance on the operating mechanism and its accessories without disturbing the switch is a "draw-out" system. This operating system, usually including a motorized charger and which may include solenoid trippers, is mounted on a drawer. The system is configured so that the operating mechanism disconnects from the switch when the drawer is pulled out from the front of the cabinet. The draw-out system has a number of disadvantages. Since the draw-out is side-mounted, it requires additional cabinet width to house the drawer. Additionally, while the operating mechanism is drawn out, there is no complete seal between maintenance personnel and the energized area in the cabinet. Most importantly, the arrangement for disconnecting and reconnecting the mechanical linkage between the operating mechanism and the switch as the drawer is withdrawn for maintenance or replaced, is located within the cabinet where maintenance is difficult and the disconnecting and reconnecting system is frequently a source of trouble.

Another system for allowing access to the switch operating mechanism while the switch is energized is the side-mount system. This system provides an operating mechanism which is mounted on the outside of the sidewall of the cabinet. A second unit, with the operating mechanism mounted on the exterior of the side wall of the cabinet is paired with the first so that the sides with the mounted operating mechanisms are facing each other, and a common maintenance access space is provided between the cabinets. The common maintenance access space may also be enclosed in a cabinet. Although this system is simpler and less expensive than the draw out system, its large lateral footprint results in increased operating costs because of the additional plant floor space requirements. Additionally, it requires that maintenance personnel work in the cramped and dangerous maintenance access space between the energized areas of the paired cabinets.

SUMMARY OF THE PRESENT INVENTION

With the foregoing in mind, the principal object of the present invention is to provide an enclosed cabinet switchgear system which requires no disconnection of the operating mechanism from the switch for opening the main door to the energized area where the switch is housed.

A further object of the invention is to provide an enclosed cabinet switchgear system which includes a simple decoupler outside of the closed safety door for disconnecting and reconnecting the operating mechanism from the switch to allow maintenance and testing of the operating system without operating the switch.

Another object of the invention is to provide an enclosed cabinet switchgear system which allows easy access to the operating mechanism components for maintenance and testing.

Still another object of the invention is to provide an enclosed cabinet switchgear system which provides a complete and safe barrier between maintenance personnel and the switch during maintenance of the operating mechanism.

Yet another object of the invention is to provide an enclosed cabinet switchgear system which presents the smallest possible cabinet size commensurate with generally accepted electrical clearances.

Another object of the invention is to provide an enclosed cabinet switchgear system which requires minimal maintenance.

These and other objects of the present invention are accomplished through an apparatus which provides for mounting all of the operating systems except the switch and the interlock systems on the exterior of the main safety door and means for maintaining operative connection between the operating mechanism and the switch when opening the main safety door, when the switch is open, for access to the area where the switch is housed. The transmission of energy from the door-mounted spring mechanism to the switch is accomplished by a series of levers, rods and bell cranks which imparts the motion from the output shaft of the operating mechanism to the switch. The combination of elements which allows opening of the door without breaking the connection between the operating mechanism and the switch resides in a substantially vertical rod positioned near the hinged edge of the door. The rod has a free-twisting joint near one end and ball joints at both ends which allow the rod to move while generating a substantially conical path through the displacement dictated by the opening of the door.

BRIEF DESCRIPTION OF THE DRAWINGS

The foregoing objects and advantages of the present invention will be more readily understood by one skilled in the art by referring to the following detailed description of a preferred embodiment and to the accompanying drawings which form a part of this disclosure, and wherein:

FIG. 6a is a sectional view of the front of the cabinet, taken along line 6—6 of FIG. 1, showing the main safety door in the closed position.

FIG. 6b is a sectional view of the front of the cabinet, taken along line 6—6 of FIG. 1, showing the main safety door in the open position.

FIG. 7 is a sectional view taken along line 7—7 of FIG. 6a.

DETAILED DESCRIPTION OF THE PREFERRED EMBODIMENT

Figure 1:
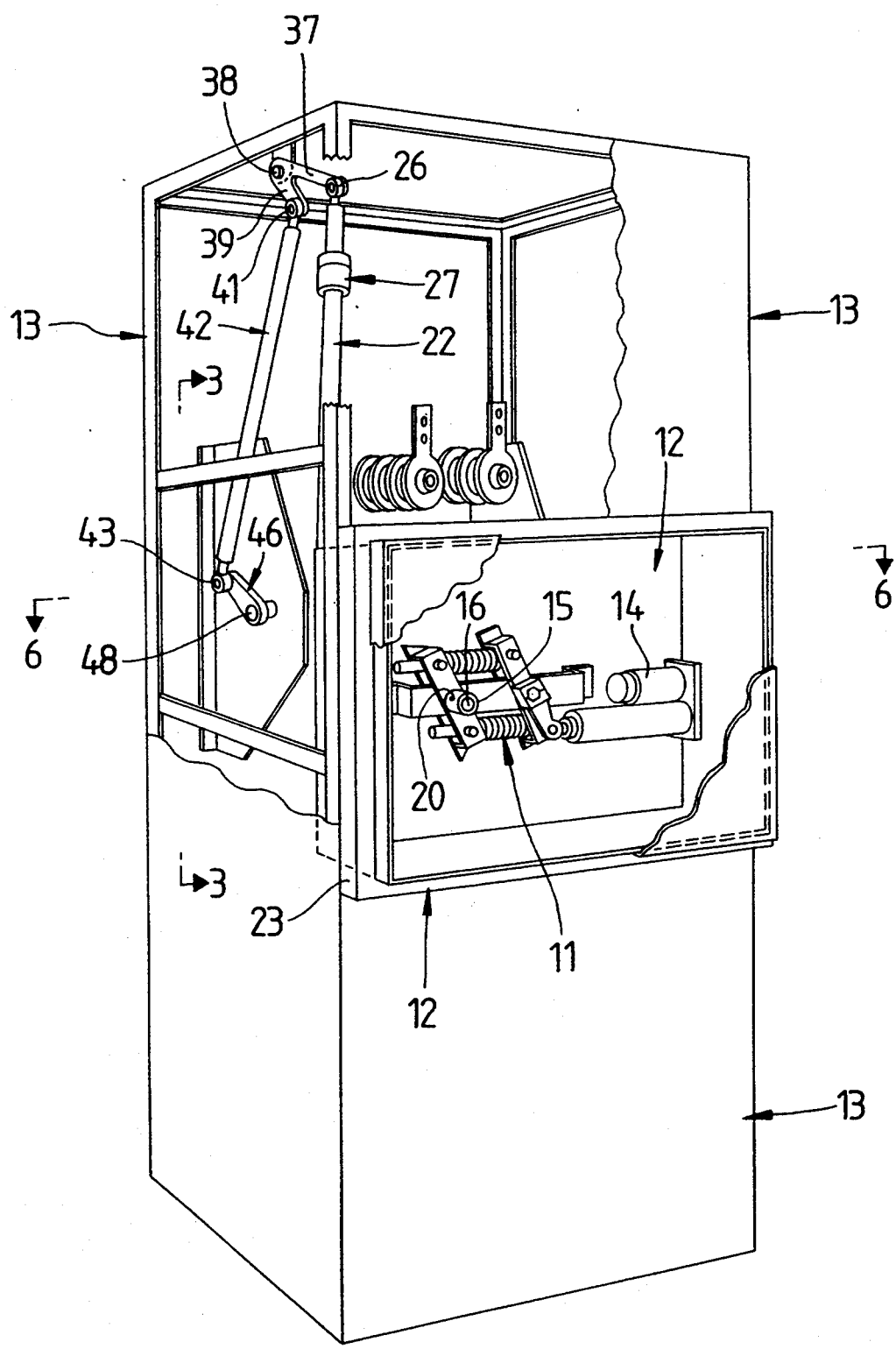
FIG. 1 is a front perspective view of the invention.
Figure 2:
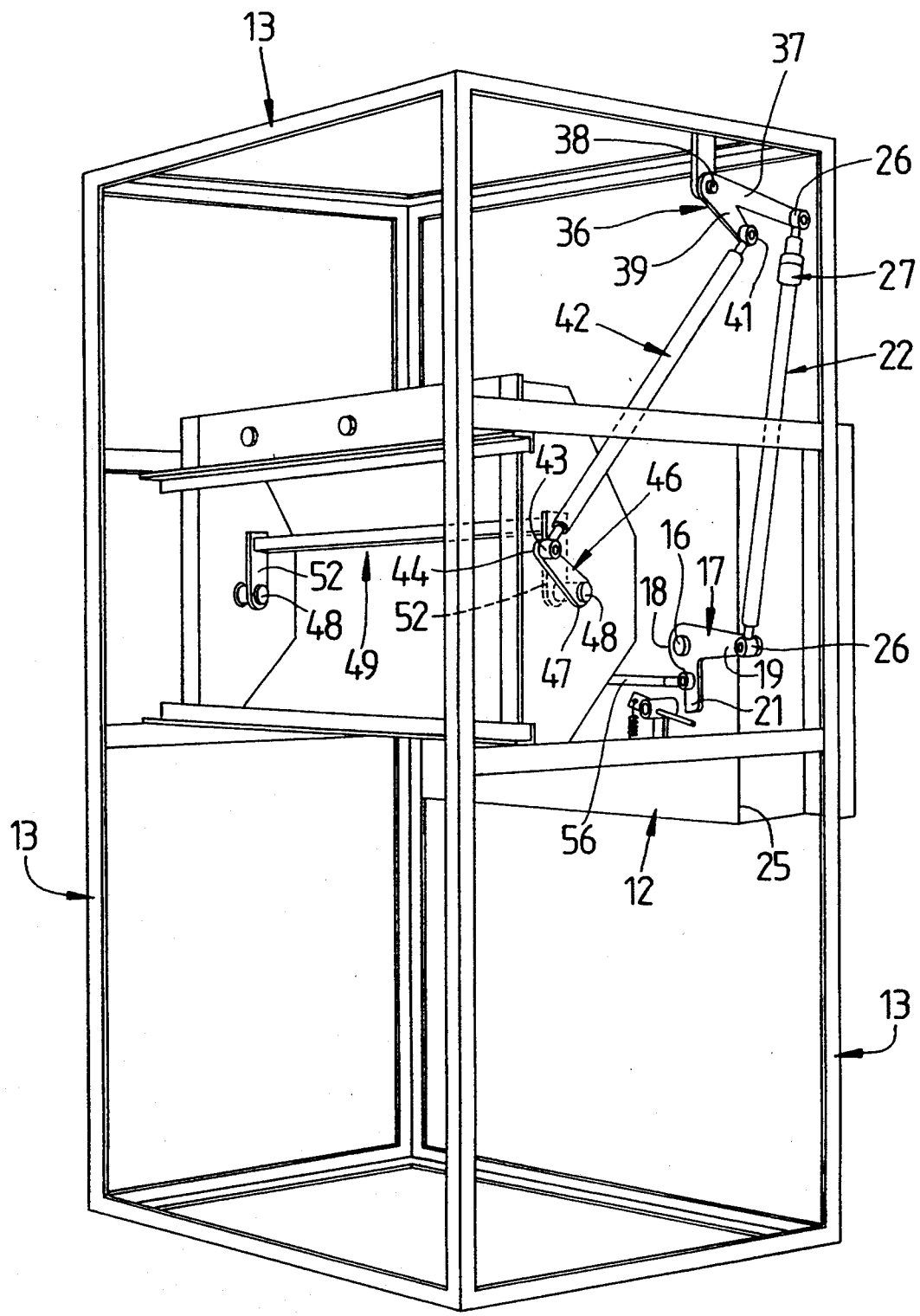
FIG. 2 is a rear perspective view of the invention.

As may be seen in FIGS. 1 and 2, the present invention uses a plurality of rods, levers, and bell cranks to provide operative connection between a switch operating mechanism mounted on the exterior of the main safety door of a metal enclosure and a high-voltage electrical switch positioned within the enclosure.

A spring operating mechanism 11 is mounted on the exterior of a heavy safety door 12 on the front of a metal cabinet 13. As shown in FIG. 6, access to the spring operating mechanism 11 is provided through an operating mechanism access door 40 hingedly attached and external to the safety door 12. The spring operating mechanism may be charged either by manual force on a crank (not shown), or by a motorized charger 14 as is well-known in the art. After the mechanism is charged, the energy stored in the springs is released by a tripping mechanism, which may be automatic release pawls or solenoid trip mechanisms.

An operator output shaft 16 extends from the operating mechanism 11, through an aperture in the safety door 12, to the interior of the cabinet 13. The shaft 16 is positioned perpendicular to the line of force transmitted by the release of the operating mechanism 11, so that tripping the spring operating mechanism 11 causes the operator output shaft 16 to rotate. To allow testing of the spring operating mechanism without opening or closing the switch, a decoupling mechanism is provided between the spring operating mechanism 11 and the operator output shaft 16. The decoupling mechanism may be a positive clutch-type mechanism, or a combination of a sleeve 15 which fits around the exterior end of the operator output shaft 16, and a pin 20, which fits through a pair of apertures in the sleeve 15 and an aperture in the end of the output shaft 16. When the pin 20 is withdrawn, the spring operating mechanism may be discharged without rotating the output shaft 16.

As shown in FIG. 2, a bell crank 17, having a pivot point 18, a first arm 19 and a second arm 21, is attached at its pivot point to the inner end of operator output shaft 16, such that rotation of the output shaft 16 causes the arms 19 and 21 to rotate about the pivot point 18 in a plane parallel to the door 12.

Figure 5:
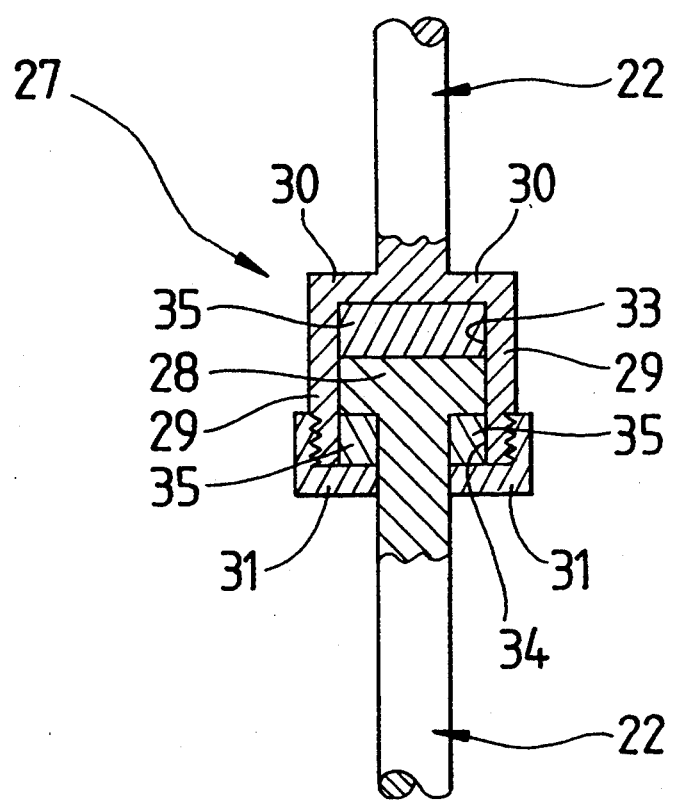
FIG. 5 is a side elevational view partly in section showing the free twisting joint in the push rod.
Figure 7:
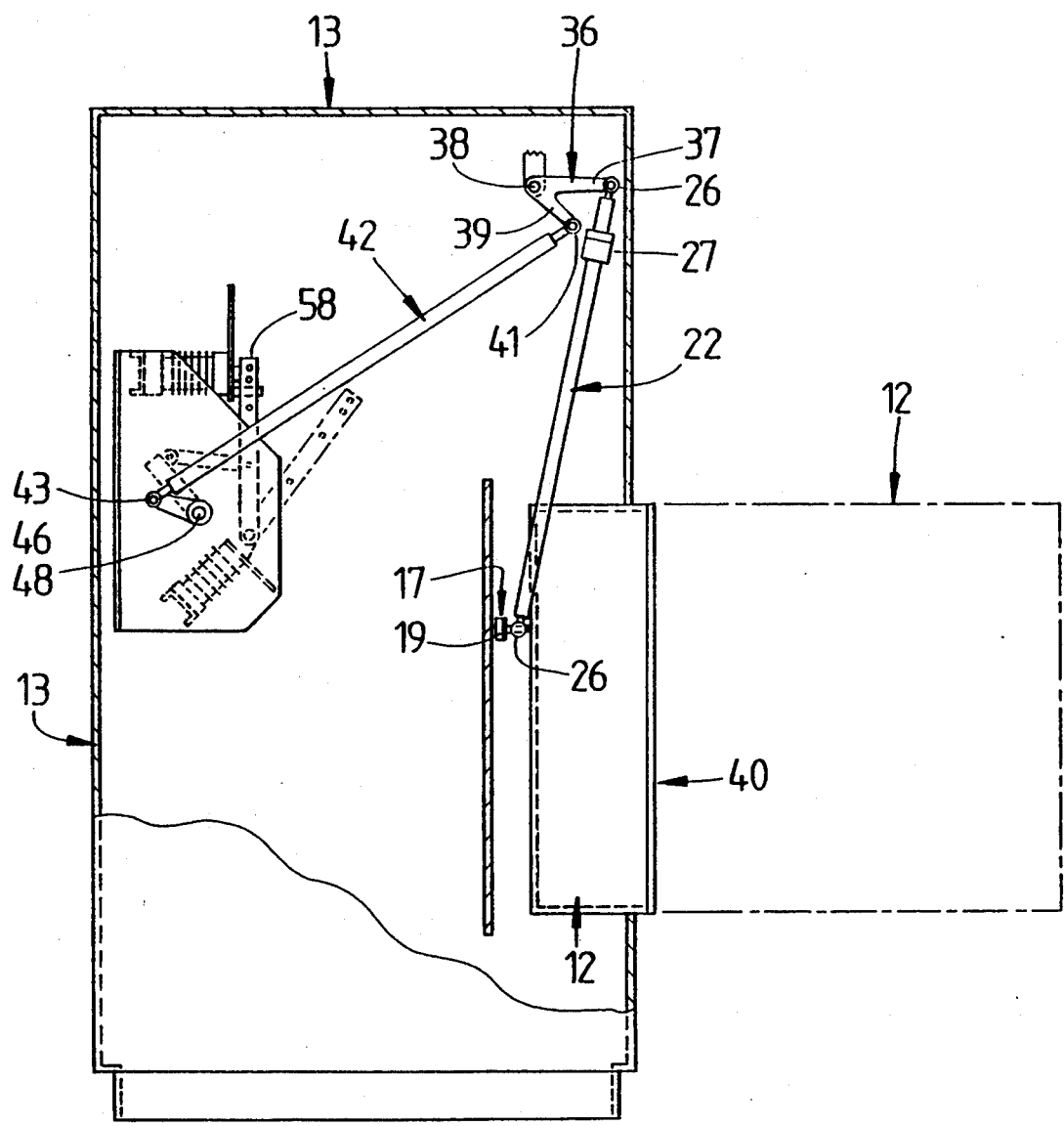

A push rod 22 is pivotally connected at one end to the first arm 19 of the bell crank 17, and is positioned substantially vertically near the corner of the cabinet 13 formed between a hinged edge 23 of the safety door 12 and the adjacent side wall 24. The uppermost end of push rod 22 is positioned as close as possible to the axis of rotation of the safety door 12 defined by the position of hinged edge 23. The lower end of push rod 22, being connected to bell crank 17, is positioned adjacent an inner corner 25 of the safety door 12 such that as the rod extends downwardly, it diverges laterally from a vertical axis extending through the uppermost end of rod 22. The push rod 22 has ball joints 26 at both ends, and a constant-length, freely rotatable joint 27 intermediate the ball joints 26. The joint 27 allows the segment of the rod below the joint and the segment of the rod above the joint to rotate about the longitudinal axis of the rod 22 independently of each other. As shown in the sectional view of the joint (FIG. 5), the lower segment of rod 22 terminates at its upper end in a disc 28. The upper segment of rod 22 has a cylindrical housing 29 at its lower end. An end cap 31, having a central aperture 32, is threadably attached to the lower end of the cylindrical housing 29. The housing 29 has an end wall 30 at its upper end. The disc 28 is positioned within the mid-section of cylindrical housing 29, defining a first chamber 33 between the disc 28 and end wall 30 and a second chamber 34 between the disc and the end cap 31. The lower segment of rod 22 extends out of the housing 29 through the aperture 32 in the end cap 31. Chambers 33 and 34 are filled with a non-deformable friction reducing material 35 such as bronze, which allows the disc 28 to rotate freely around the longitudinal axis of the rod 22, but prevents movement of the disc 28 along that axis.

Push rod 22 is pivotally connected at its uppermost end to an arm 37 of a second bell crank 36. Bell crank 36 also has a pivot point 38 and a second arm 39. In the preferred embodiment, bell crank 36 is pivotally mounted at its pivot point 38 to the side wall 24 of the cabinet 13. The second arm 39 of the bell crank 36 is pivotally connected to a first end 41 of a second push rod 42. Push rod 42 extends downward to a second end 43. The second end 43 of the push rod 42 is pivotally attached to an end 44 of a lever 46. The opposite end 47 of lever 46 is affixed to a connection end 48 of a switch operating shaft 49. As shown in FIG. 2, the switch operating shaft has a main shaft 51, two side arms 52 extending laterally from both ends of the main shaft 51, and two connection ends 48, extending laterally from the side arms 52 parallel to the main shaft 51.

When the spring operating mechanism 11 is tripped, one of the high-tension springs exerts a horizontal force which rotates the operator output shaft 16. When the shaft is rotated in a clockwise direction (as viewed from the front of the cabinet), the switch opens. When the mechanism 11 rotates the shaft 16 in a counter-clockwise direction, the switch closes. The clockwise rotation of the shaft 16 causes the end of the first arm 19 of bell crank 17 to move upward, forcing push rod 22 upward. Push rod 22 in turn exerts an upward force against the end of the first arm 37 of the second bell crank 36. The second arm 39 of bell crank 36 also moves upward, causing the second push rod 42 to move upward. Push rod 42 pulls the end 44 of lever 46 upward. The movement of end 44 causes the connection end 48 of the switch operating shaft 49 to rotate, moving the main shaft 51 to the open position. The counter-clockwise rotation of the operator output shaft 16 moves all of the components in the opposite direction from that described above, resulting in movement of the switch operating shaft 49 to the closed position.

Figure 4:
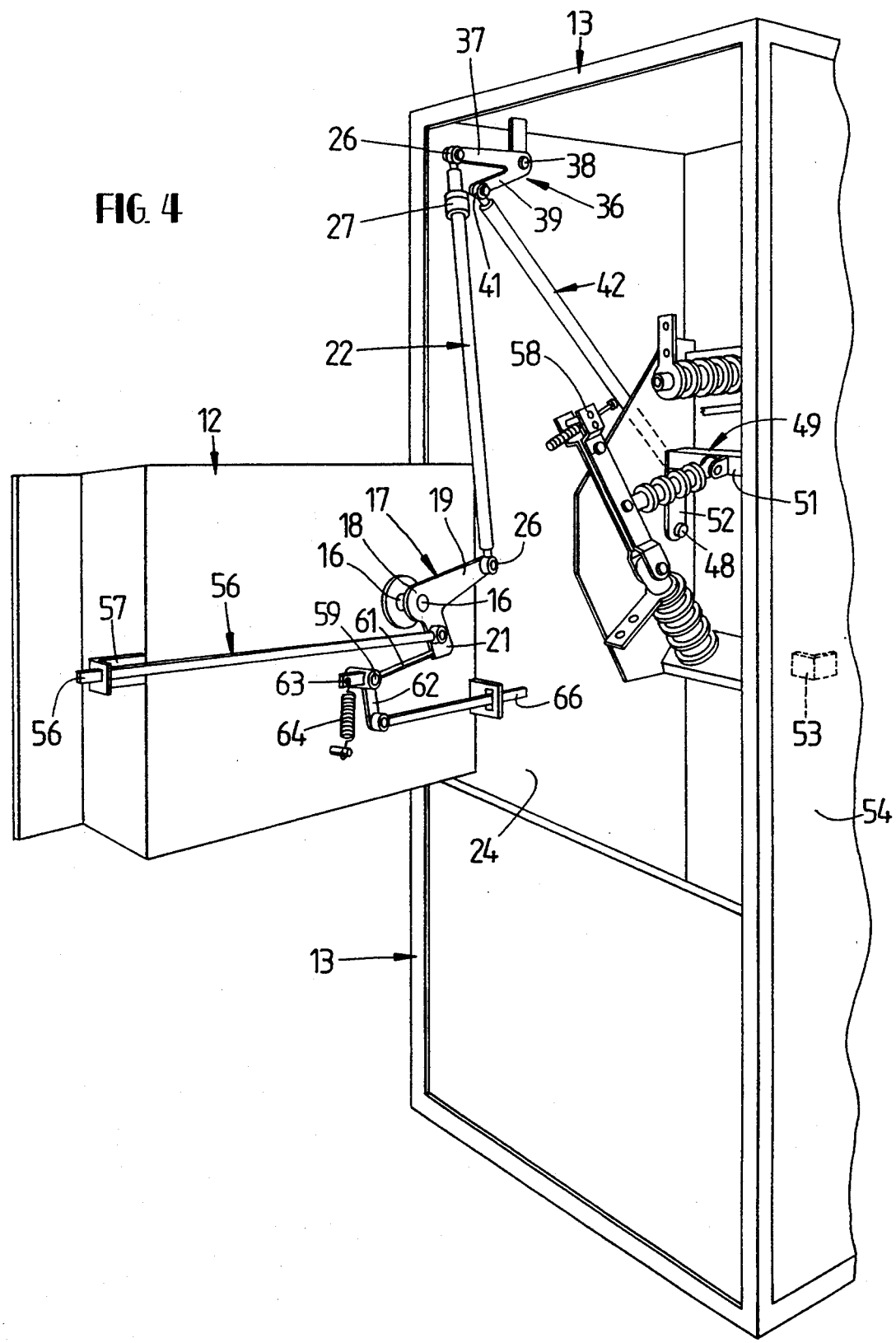
FIG. 4 is a partial front perspective view showing the safety door in the open position.
Figure 8A:
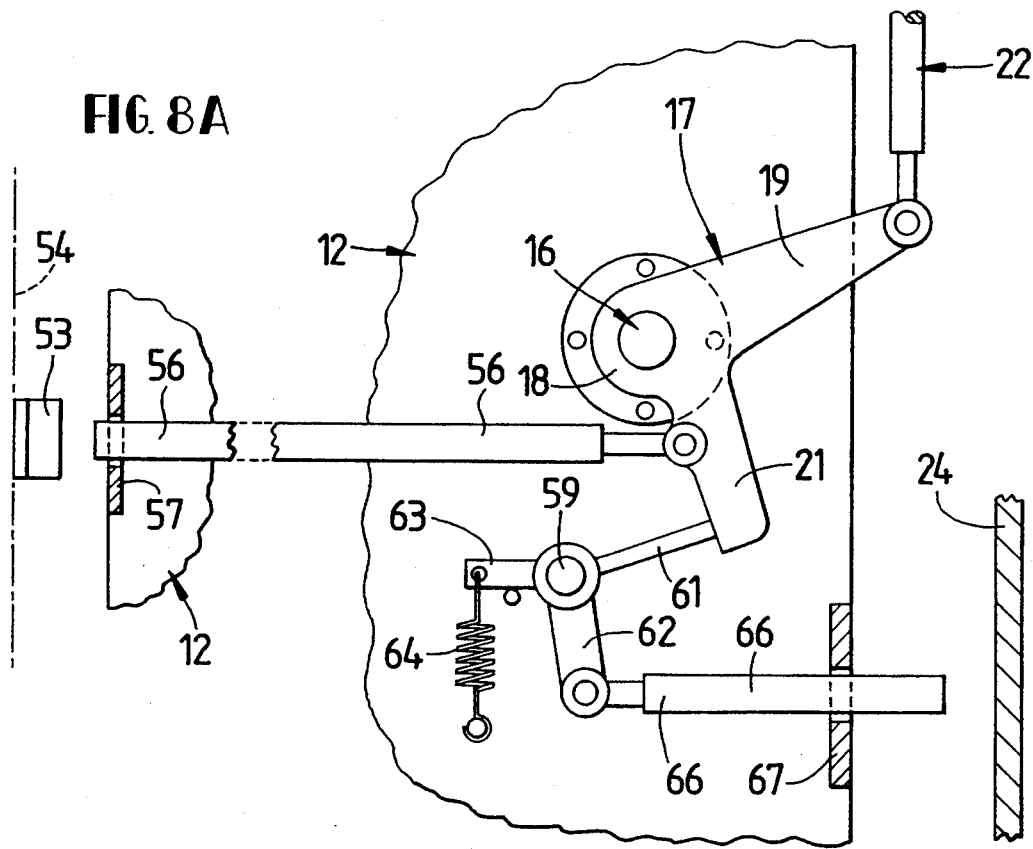
FIG. 8a is a rear elevational view of the switch and door interlock mechanisms as they are positioned when the switch is open.
Figure 8B:
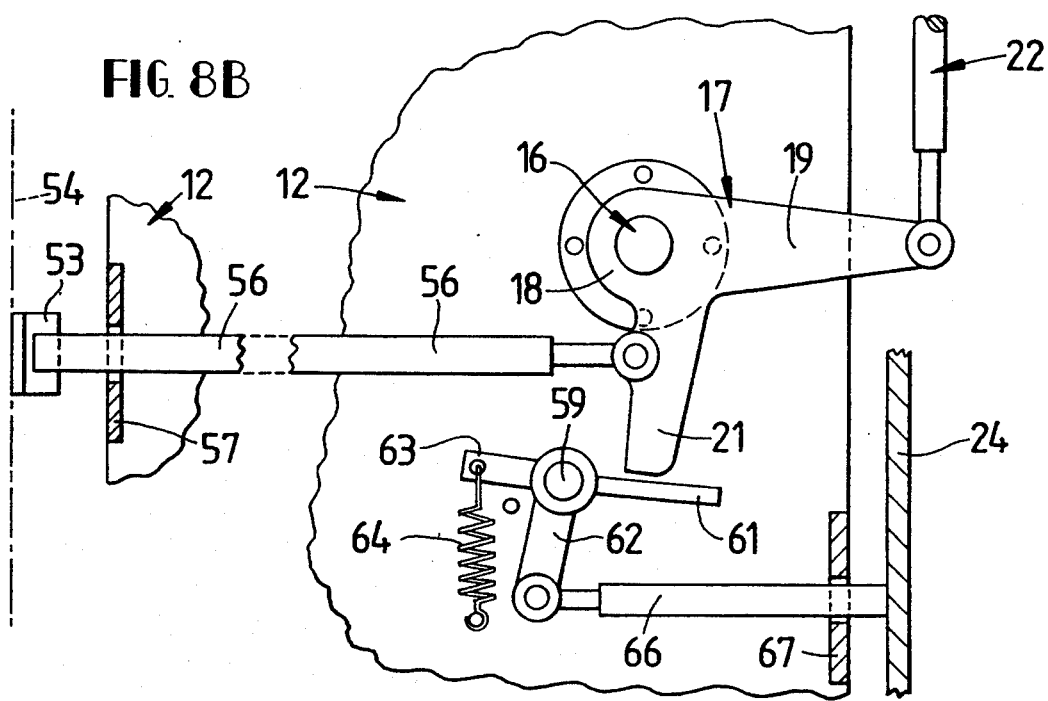
FIG. 8b is a rear elevational view of the switch and door interlock mechanisms as they are positioned when the switch is closed.

As shown in FIGS. 4, 6 and 8, a door interlock mechanism is provided so that the safety door 12 to the cabinet cannot be opened when the switch is in the closed position. A lip 53 protrudes from a point proximal the front of a side wall 54 opposite side wall 24. The lip is aligned with the interior surface of closed safety door 12. A third push rod 56 is pivotally connected at one end to the second arm 21 of bell crank 17. Push rod 56 is slidably supported at its opposite end by a bracket 57, which is mounted to the safety door 12 in a position such that the bracket 57 is adjacent the lip 53 when the door is closed. As operator output shaft 16 rotates in a counter-clockwise direction (as viewed from the front of the cabinet), closing the switch, the end of second arm 21 of bell crank 17 rotates toward side wall 54. Arm 21 pushes push rod 56 beyond bracket 57 toward the side wall 54, until the end of the push rod comes to rest securely behind the lip 53, locking the door 12 closed. When the operator output shaft 16 rotates in a clockwise direction, opening the switch, the second arm 21 of bell crank 17 rotates toward side wall 24 and pulls rod 56 toward side wall 24 and away from side wall 54 and lip 53, allowing door 12 to be opened.

Figure 3:
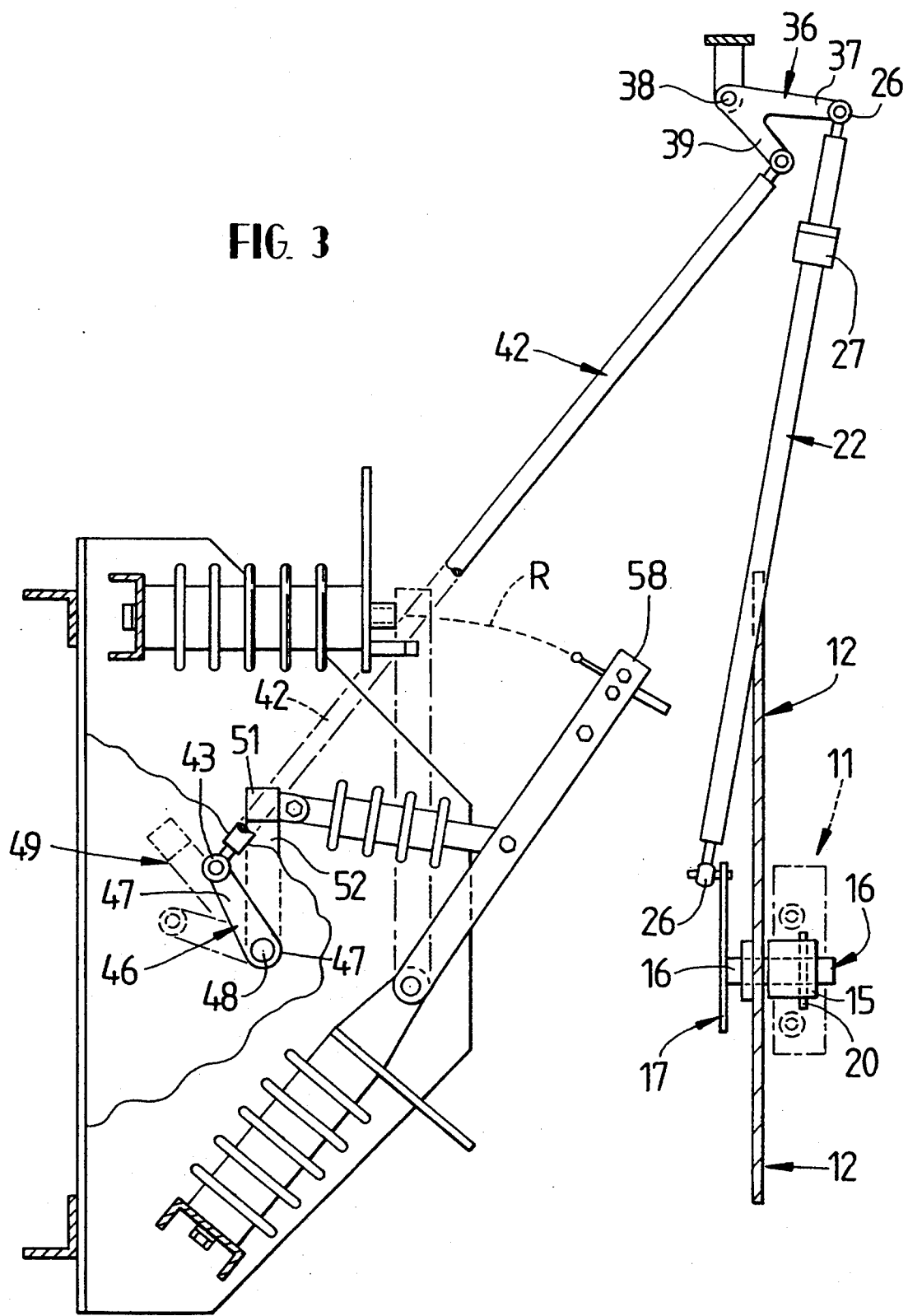
FIG. 3 is a sectional view taken along line 3—3 of FIG. 1.

The door 12 may be opened without breaking the operative connection between the spring operating mechanism 11 and the switch operating shaft 49 because of the position and operation of push rod 22. As safety door 12 is opened, rod 22 moves through a substantially conical path. If the top ball joint 26 of rod 22 is positioned directly on the axis of rotation of the safety door 12, the constant-length freely rotatable rod 22 does not induce any movement of the second bell crank 36. If, as in the preferred embodiment, the upper end of rod 22 is spaced any distance from the axis of rotation of safety door 12, the movement of rod 22 through the displacement dictated by the opening of the safety door 12 will induce some movement of the second bell crank 36 and consequently of the switch operating shaft 49. The distance of movement of the switch operating shaft 49 decreases as the upper end of rod 22 approaches the axis of rotation of the safety door 12. Slight movement of the switch operating shaft 49, causing no more than 0.5 inch of radial movement of the switch blades 58 at the switch contact radius (labelled "R" on FIG. 3) is operationally acceptable. Movement of the switch blades 58 within this tolerance may be maintained by positioning the upper end of rod 22 as close as possible to the axis of rotation of safety door 12 and may be eliminated entirely by constructing the cabinet 13 so that the upper end of rod 22 may be positioned directly on the axis of rotation of the safety door 12.

As shown in FIG. 8, a second interlock prevents the transmission of force from the spring operating mechanism to the switch operating shaft when the door is open, so that the switch cannot be closed. A switch interlock shaft 59 is rotatably mounted on the interior surface of safety door 12, proximal the end of second arm 21 of bell crank 17. A switch detent 61, switch interlock lever 62, and extension spring arm 63, each having an outer end, extend radially from the switch interlock shaft 59. Switch detent 61 is positioned so that when the safety door 12 is open, the outer end of detent 61 engages the end of second arm 21 of bell crank 17, preventing it from rotating in a clockwise direction (viewed as in FIG. 8) to close the switch. Switch detent 61 is held in position to engage arm 21 by an extension spring 64 connected at one end to the outer end of the extension spring arm 63 and mounted at a second end to the surface of safety door 12. A switch interlock rod 66 is pivotally mounted at an end thereof to the outer end of the switch interlock lever 62. The opposite end of the switch interlock rod 66 is slidably supported by a bracket 67 mounted adjacent the inner corner 25 of the safety door 12 such that the opposite end of the switch interlock rod 66 extends beyond the inner corner 25 of the safety door 12 and such that the rod 66 extends substantially horizontally adjacent the inner surface of the safety door 12. The switch interlock rod 66 is of sufficient length such that as the safety door 12 is closed, the rod 66 engages side wall 24 and is urged toward opposite side wall 54. As the switch interlock rod 66 moves toward side wall 54, it in turn rotates the switch interlock lever 62 clockwise (again viewed as in FIG. 8). When the switch interlock lever 62 is rotated clockwise, the switch interlock shaft 59 also rotates clockwise, moving the switch detent 61 downward and out of engagement with second arm 21 of bell crank 17 so that the switch can be operated. Extension spring arm 63 likewise rotates in a clockwise direction, stretching the extension spring 64. When the safety door 12 is opened, moving the switch interlock rod 66 out of engagement with side wall 24, the spring 64 contracts, rotating the switch detent 61 counter-clockwise into engagement with second arm 21 of bell crank 17, thereby preventing the switch from closing.

While I have shown my invention in one form, it will be obvious to those skilled in the art that it is not so limited but is susceptible of various changes and modifications without departing from the spirit thereof.

Having set forth the nature of the invention, what I claim is:

1. An apparatus for actuating a high-voltage switch wherein the switch is selectively movable pivotably from an open position to a closed position about a switch operating shaft, said switch and a plurality of electrical connections thereto being housed within a metal enclosure having a side wall, a door forming another side thereof, said door being mounted for hinged movement along one edge thereof proximal said side wall, said door having an exterior surface, an interior surface, and an aperture therethrough, the improvement in combination therewith comprising:

(a) a switch operating assembly mounted to the exterior surface of said door and extending through said aperture and movable concomitantly with said door; and (b) linkage means mounted to the interior surface of said door and said enclosure for transferring stored torsional energy from said switch operating assembly to said switch shaft.

2. An apparatus as defined in claim 1 wherein said linkage means comprises:

(a) means, positioned adjacent the interior surface of said door opposite from and in operative connection with said switch operating assembly, for changing the direction of a force imparted by said switch operating assembly from a first direction to a second direction orthogonal to said first direction;

(b) means connected to said orthogonal direction-changing means for transferring said force linearly in said second direction;

(c) means connected to said linear force transferring means, for changing the direction of said force from said second direction to a third direction; and (d) means, intermediate said second direction-changing means and said switch shaft, for transferring said force to said switch shaft linearly in said third direction.

3. An apparatus as defined in claim 2, wherein said switch operating assembly further comprises an operator output shaft, operatively connected to said orthogonal direction changing means, said operator output shaft extending through said aperture in said door.

4. An apparatus as defined in claim 3 wherein said orthogonal direction changing means comprises a first bell crank, having a pivot point and an arm extending outwardly from said pivot point, said pivot point of said first bell crank being mounted on an end of said operator output shaft such that rotation of said operator output shaft causes said arm to rotate about said pivot point.

5. An apparatus as defined in claim 4 wherein said first linear force transferring means comprises a first rod, said first rod having a first end and a second end.

6. An apparatus as defined in claim 5 wherein said second direction changing means comprises a second bell crank having a pivot point, a first arm and a second arm, said first and second arms extending outwardly from said pivot point, said second bell crank being pivotally mounted at its pivot point adjacent said side wall of said enclosure, said first arm being pivotally connected to said second end of said first rod, such that linear movement of said first rod causes said first and second arms of said second bell crank to rotate about said pivot point of said second bell crank.

7. An apparatus as defined in claim 6 wherein said second linear force transferring means comprises:

(a) a second rod, said second rod having a first end and a second end, said first end being pivotally connected to said second arm of said second bell crank; and (b) a lever, having a first end and a second end, said first end being pivotally connected to said second end of said second rod, and said second end of said lever being rigidly mounted on an end of said switch operating shaft, such that moving said first end of said lever rotates said switch operating shaft, causing said switch to move between said open position and said closed position.

8. An apparatus as defined in claim 7, wherein said first rod further comprises:

(a) a first ball joint, mounted on said first end of said first rod;

(b) a second ball joint, mounted on said second end of said first rod;

(c) a first rod segment, connected to said first ball joint at said first end of said rod and having a rotation end at a rotation point intermediate said first end and said second end;

(d) a second rod segment, connected to said second ball joint at said second end of said rod and having a rotation end at said rotation point; and (e) a joint, located at said rotation point, said joint comprising:

(i) a cylindrical housing, having an end wall and an inner surface, said end wall being rigidly affixed to said rotation end of said second segment of said rod;

(ii) an end cap, having an aperture therethrough, said end cap being rigidly affixed to an end of said housing opposite said end wall of said housing;

(iii) a disc, rigidly affixed to said rotation end of said first rod segment, said disc having a mounting surface and a second surface opposite said mounting surface, said disc being positioned within said cylindrical housing such that said second surface is spaced from and facing said end wall of said housing, said end wall, said second surface and said inner surface of said cylindrical housing defining a first chamber, said first rod segment extending outwardly from said mounting surface of said disc through said aperture in said end cap, said mounting surface, said first segment of said rod and said end cap defining an annular chamber; and (iv) means, disposed within said first chamber and said annular chamber, for reducing friction generated by the rotation of said disc within said cylindrical housing, said friction-reducing means being non-deformable.

9. An apparatus as defined in claim 8 further comprising means, affixed to said door and in operating relationship with said switch operating assembly, for locking said door in a shut position when said switch is in said closed position.

10. An apparatus as defined in claim 9, wherein said door-locking means comprises:

(a) a second arm on said first bell crank, extending outwardly from said pivot point, and positioned such that the end of said second arm opposite said pivot point is forced toward said side wall of said enclosure as said switch moves to said open position, and such that said end of said second arm is forced away from said side wall as said switch moves to said closed position;

(b) a bar, having a first end and a locking end, said first end pivotally attached to said second arm of said first bell crank;

(c) a lip, extending from a second side wall of said enclosure opposite said first side wall; and (d) means for movably attaching said bar to said door in position such that said locking end of said bar extends behind said lip when said switch is in said closed position thereby locking said door shut and such that said locking end of said bar moves away from said lip when said switch is in said open position, thereby allowing said door to be opened.

11. An apparatus as defined in claim 10, further comprising means, mounted on said door, for locking said linkage means when said door is open such that said switch cannot be closed.

12. An apparatus as defined in claim 11, wherein said switch-locking means comprises:

(a) a switch interlock shaft, rotatably mounted to said interior surface of said door proximal said second arm of said first bell crank;

(b) a switch detent, having an inner end and an outer end, extending radially outwardly from and rigidly connected at said inner end to said switch interlock shaft such that rotation of said switch interlock shaft causes said switch detent to rotate about said shaft, said detent movable between a locked position wherein said detent is in engagement with said second arm of said first bell crank, preventing rotation of said first bell crank toward said detent, and a released position wherein said detent is out of engagement with said second arm of said bell crank;

(c) a switch interlock lever, having an inner end and an outer end, extending radially outwardly from and rigidly connected at said inner end to said switch interlock shaft such that rotation of said switch interlock shaft causes said switch interlock lever to rotate about said shaft, said lever movable between a locked position and a released position;

(d) an extension spring arm, having an inner end and an outer end, extending radially outwardly from and rigidly connected at said inner end to said switch interlock shaft such that rotation of said switch interlock shaft causes said spring arm to rotate about said shaft, said spring arm movable between a locked position and a released position;

(e) an extension spring, having a first end and a second end, said first end connected to said outer end of said spring arm and said second end mounted on said interior surface of said door, said second end positioned such that said spring is extended when said spring arm is in said released position and such that when said spring contracts, it moves said spring arm to said locked position, concomitantly rotating said detent about said switch interlock shaft into said detent's locked position wherein said detent is in engagement with said second arm of said bell crank;

(f) a switch interlock rod, having a first end and a second end, said first end pivotally attached to said outer end of said switch interlock lever; and (g) means, positioned adjacent said interior surface of said door, for slidably supporting said second end of said switch interlock rod such that when said door is closed said second end of said switch interlock engages said side wall and is urged away from said side wall, rotating said switch interlock lever to said released position and concomitantly rotating said switch detent to said released position and extending said spring, and such that when said door is opened, said second end of said switch interlock rod is moved out of engagement with said side wall such that said switch interlock lever may rotate to said locked position and said spring may contract, rotating said detent to said locked position.

13. An apparatus as defined in claim 12 wherein said supporting means comprises a bracket, affixed to said inner surface of said door.

14. An apparatus for actuating a high-voltage electrical switch enclosed within a metal cabinet, said cabinet having a side wall and an impervious door forming another side thereof, said door having a hinged edge adjacent said side wall, said switch being selectively movable between an open and closed position by rotation about a switch operating shaft, comprising:

(a) a horizontally disposed spring operating mechanism mounted to the exterior of said door, said door having an aperture therethrough;

(b) means, intermediate said spring operating mechanism and said switch, for transmitting force from said operating mechanism to said switch operating shaft.

15. An apparatus as defined in claim 14, wherein said transmitting means comprises:

(a) means for maintaining operative connection between said spring operating mechanism and said switch operating shaft when said door is opened, said means being disposed proximal said hinged edge of said door;

(b) means, intermediate said spring operating mechanism and said connection-maintaining means for changing the direction of a horizontal force imparted by said spring operating mechanism from a first horizontal direction to a second vertical direction;

(c) means, intermediate said connection-maintaining means and said switch operating shaft for changing the direction of a force imparted through said connection-maintaining means from said second vertical direction to a third direction; and (d) means, intermediate said second-to-third direction-changing means and said switch operating shaft, for transmitting force in said third direction to said switch operating shaft.

16. An apparatus as defined in claim 15, wherein said connection-maintaining means comprises:

(a) a first rod segment, having a first end and a joint end;

(b) a first ball joint, affixed to said first end of said first rod segment;

(c) a second rod segment, having a joint end and a second end;

(d) a second ball joint, affixed to said second end of said second rod segment;

(e) a cylindrical housing, having an end wall, the exterior surface of said end wall being integrally mounted on said joint end of said second rod segment;

(f) an end cap, affixed to an end of said cylindrical housing opposite said end wall, said end cap having an aperture therethrough;

(g) a disc, having a first side and a mounting side, said mounting side integrally mounted on said joint end of said first rod segment, said disc further positioned within said cylindrical housing such that said first side of said disc is spaced from and facing the interior surface of said end wall, forming a first chamber therebetween, said mounting side is spaced from and facing said end cap, forming a second chamber therebetween, and said first rod segment extends outwardly from said disc through said aperture in said end cap; and (h) means, disposed within said first and second chambers, for reducing friction, said friction-reducing means being non-deformable.

17. An apparatus as defined in claim 15 wherein said first direction-changing means comprises:

(a) an operator output shaft, in operative connection with said spring operating mechanism, said operator output shaft extending through said aperture in said door; and (b) a bell crank, having an arm extending outwardly from a pivot point, said pivot point being connected to an end of said operator output shaft adjacent the interior surface of said door, such that said arm rotates about said pivot point as said operator output shaft rotates, an end of said arm opposite said pivot point being pivotally connected to said first ball joint at said first end of said first rod segment.

18. An apparatus as defined in claim 17, wherein said second direction changing means comprises a second bell crank, having a pivot point, a first arm and a second arm, said first arm being pivotally connected to said second ball joint at said second end of said second rod segment, and said pivot point being pivotally mounted adjacent said side wall of said cabinet.

19. An apparatus as defined in claim 18, wherein said means for transmitting said force in said third direction comprises:

(a) a rod, having a first end and a second end, said first end being pivotally attached to said second arm of said second bell crank; and
(b) a lever having a first end and a second end, said first end of said lever being pivotally attached to said second end of said rod, said second end of said lever being rigidly affixed to an end of said switch operating shaft, such that moving said first end of said lever rotates said switch operating shaft, causing said switch to move between said open and closed positions.

20. An apparatus as defined in claim 14 wherein said force transmitting means comprises at least one connective member mounted at opposing end points thereof to said door and said enclosure, including means intermediate said opposing ends for permitting said opposing ends to rotate independently about a longitudinal axis of said connective member.

* * * * *